April 7, 1953 H. D. McWATERS 2,634,084
ELECTRIC EYE PACKING GATE
Filed Feb. 2, 1949 3 Sheets-Sheet 2

INVENTOR.
Harry D. McWaters
BY Kenway, Jenney,
Witter + Hildreth

April 7, 1953 H. D. McWATERS 2,634,084
ELECTRIC EYE PACKING GATE
Filed Feb. 2, 1949 3 Sheets-Sheet 3

INVENTOR.
Harry D. McWaters
BY Kenway, Jenney,
Witter & Hildreth

Patented Apr. 7, 1953

2,634,084

UNITED STATES PATENT OFFICE 2,634,084

ELECTRIC EYE PACKING GATE

Harry D. McWaters, Pampa, Tex., assignor to Godfrey L. Cabot, Inc., Boston, Mass., a corporation of Massachusetts Application February 2, 1949, Serial No. 74,214

1 Claim. (Cl. 249—58)

This invention relates to apparatus for loading finely divided material into containers and more particularly to improvements in such apparatus for stopping the flow of material precisely when a given weight of material has been deposited in the container. In one aspect this invention relates to improved mechanism for loading carbon black into bags.

In loading free flowing materials such as carbon black, the material is generally conveyed to a large hopper or tank at the bottom of which is an opening provided with a gate valve. A bag or container is generally placed on a scale directly under the gate valve. The operator stands in front of the machine at a point where he can read the scale, positions the bag on the scale beneath the opening, and opens the gate valve admitting the material into the bag. When the desired weight is approached, the operator commences to close the valve, and then attempts to shut it off completely upon arriving at the exact weight.

The conventional apparatus above described has numerous disadvantages. First, there is a general tendency to slightly overload each bag in order to be sure that each bag is at least adequately loaded. Second, the operator is apt to grossly overload the bag by mistake, whereupon it will be necessary for him to shovel out the excess material; a time-consuming operation, and in the case of carbon black extremely inconvenient to personnel. Third, with the conventional apparatus, the operator only has one hand free to control the position of the bag and to keep its edges held closely to the hopper opening. Fourth, the conventional apparatus requires considerable skill because the scale indicator moves very rapidly through the critical weight segment of the dial indicator. Furthermore, since a small amount of material is still in free fall when the gate is finally closed, the operator must develop expert timing in closing the gate a fraction of a second before full weight is reached and thus to load the bag accurately without closing the gate and opening it several times before completion.

It is an object of my invention to provide a gate valve which will close automatically and accurately depositing the proper weight of material in a container without the necessity of an operator controlling the valve by visual reference to a scale.

It is a further object of my invention to provide such a gate valve which will require no action from the operator other than that necessary to open it, and whereby after opening the valve, the operator will have both hands free to control the position of the bag with relation to the opening.

It is an additional object of my invention to provide an automatically closing gate valve, the rate of flow of which may be readily adjusted.

In the accomplishment of the objects of my invention I provide a gate valve which when once fully opened, will be held in that position until the bag is almost fully loaded, whereupon the gate is automatically released by mechanism responsive to the weight of the material in the bag, and thereafter caused to close to a position where the flow of material is greatly reduced. The gate valve remains in this latter position until the bag is almost filled to the desired weight; that is, to a weight equal to the desired weight less the weight of the material that is still falling from the gate. When this latter weight is reached, a second weight responsive mechanism is actuated releasing the gate which in turn is caused to come to the fully closed position.

It is a further feature of my invention that the weight responsive members include photo-electric cells used in conjunction with shutters and the shaft linkage of the scale upon which the bag or container rests, and that these photo-electric cells control mechanism for allowing the gate to close. As an additional feature of my invention all of the electrical mechanisms used in actuating the moving members of the apparatus are hermetically sealed to prevent the penetration of carbon black into their interiors.

Further objects and features of my invention will become apparent from a detailed description of a preferred embodiment thereof, selected for the purposes of illustration and shown in the accompanying drawings in which.

In its general organization, the preferred embodiment of my invention includes a scale unit and a packing gate unit.

Figure 1:
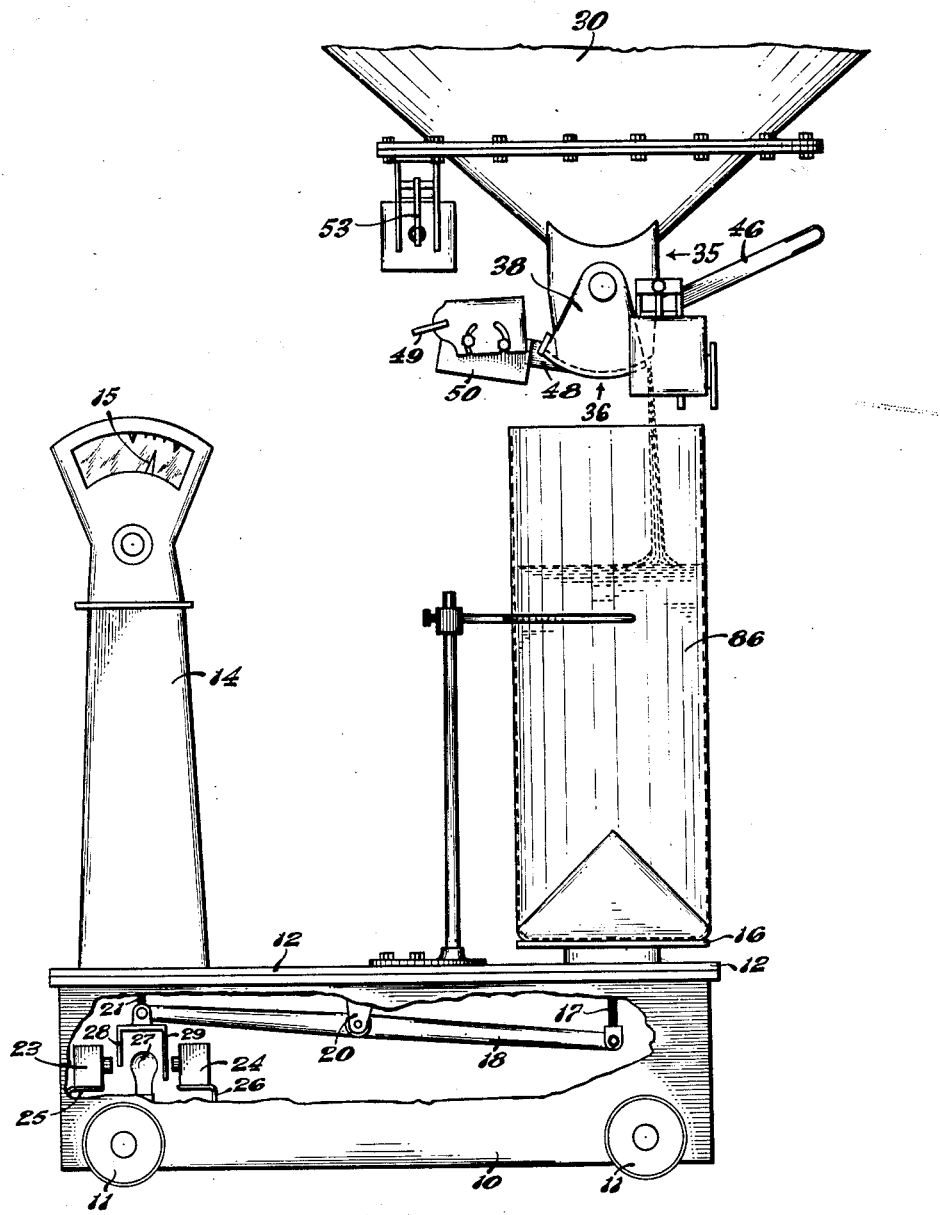
Fig. 1 is a view in side elevation of the packing gate and the scale, with the gate valve shown in its dribble position.

The scale unit may comprise a conventional weighing mechanism as shown generally in Fig. 1, including a base frame 10 having a top 12, and being supported on wheels 11. At one end of the scale unit, the weighing mechanism (not shown)

is housed in a vertical column 14, upon the top of which a visual weight indicator 15 may be mounted. A scale platform 16 is located at the other end of the scale unit. Suitable linkage is provided between the scale platform 16 and the weighing mechanism within the column 14, and may preferably include a transverse rocker arm 18 supported by a suitable pivot bearing 20 and actuated at one end by a vertical shaft 17 connected to the scale platform 16. At its other end the rocker arm 18 may be connected to a vertical shaft 21 which in turn controls the operation of the weighing mechanism.

The packing gate unit is controlled as will be further explained below by two photo-electric cells 23 and 24 located in the base of the scale unit beneath the rocker arm 18 in the vicinity of the shaft 21 and supported on brackets 25 and 26 respectively which are secured to the base frame 10. The cells 23 and 24 are placed one on each side of a conventional electric light bulb 27 suitably connected and supported, and a pair of shutters 28 and 29 suspended from the rocker arm 18 serve to control the admission of light to the cells 23 and 24 respectively. More will be said below about the details of control involved in the use of the cells but it will suffice to add here that when the shaft 17 is fully extended upward with no weight upon the scale platform 16, the shutters are adapted completely to blank off the admission of light to the cells. As weight is added to the platform 16 causing the shaft 17 to lower, the shutters being on the opposite end of the rocker arm 18 lift up. The shutter 29 extends further down than the shutter 28, with the result that, as the shutters are raised, light is first admitted to the cell 23. Thereafter more weight must be added to the scale platform 16 to further rock the arm 18, raise the shutter 29 and admit light to the cell 24.

The packing gate unit is secured to the bottom of a large hopper 30 preferably of steel construction and has for its immediate support a hopper bottom piece 31, likewise of steel construction in the form of a hollow inverted truncated cone resembling a funnel. The hopper 30 and bottom piece 31 are provided with coextensive flanges 32 and 33 respectively which, being bolted together by bolts 34, serve to connect the upper part of the bottom piece 31 to the bottom opening of the said hopper 30.

Leading from the lower opening of the hopper bottom piece 31 is a rectangular duct 35 having side walls 37 and end walls 38 which are welded together and continuously welded along their upper edges to the bottom piece 31 around its lower opening. A gate valve 36 covers the bottom of the duct 35 and is pivotally mounted on horizontally disposed, axially aligned bearings 40 secured to the end walls 38 of the said duct. The gate valve 36 includes a curved plate 41 which is formed in the shape of a segment of a cylinder and which is supported laterally by two parallel side plates 42. The side plates 42 are mounted for rotation one upon each of the bearings 40, and the curved plate 41 is connected between the said side plates 42 with its cylindrical axis concentric with the rotational axis of the said bearings 40. The lower edges of the end walls 38 of the duct 35 are machined to conform accurately to the radius of the inner surface of the cylindrical plate 41, and likewise concentric to the axis of the bearings 40. In addition, the side walls 37 of the said duct are also machined accurately to conform to the path of the inner surface of the cylindrical plate 41. Thus the cylindrical plate 41 is held in close sliding relation to the lower edges of the side walls 37 and end walls 38 of the duct 35, and since the cylindrical plate 41 covers a larger area than the bottom opening of the duct 35, it completely closes off the duct 35 when rotated into such position.

Figure 2:
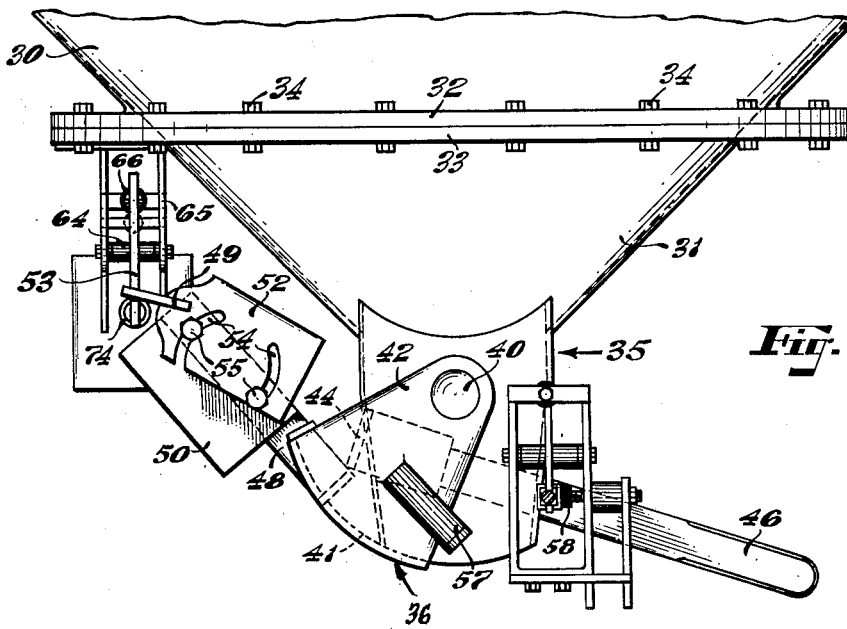
Fig. 2 is a view in side elevation of the packing gate alone showing it in the fully opened position.
Figure 3:
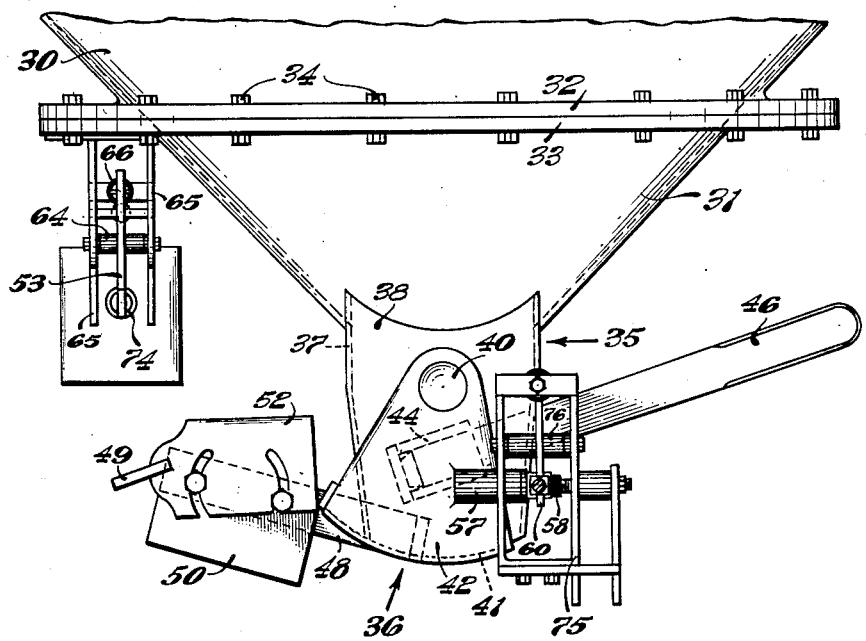
Fig. 3 is a view in side elevation of the packing gate showing the gate valve in the partially closed dribble position.

The right hand end plate 42 of the gate valve 36 is provided with a socket 44 adapted to receive a hand lever 46 disposed parallel to the said right hand end plate and extending to the front of the gate valve 36. An arm 48 is welded to the right hand end plate 38 below the socket 44 and, extending to the rear, serves to support counterweights 50 and 51. It will thus be evident from Figs. 2 and 3, that the counterweights 50 and 51 urge the gate valve 36 into the closed position by force of gravity and that the hand lever 46 is employed to open the said valve in opposition to the force of the said weights.

When the arm 46 is depressed so as fully to open the gate valve 36, a latch 49 mounted on a plate 52 which is secured to the arm 48, engages a hook 53 which serves to hold the said gate valve 36 in the fully opened position. The plate 52 is provided with arcuate slots 54 and is secured to the arm 48 by means of bolts 55 which are spaced in conformance with slots 54. Thus it will be evident that the position of the plate 52 may be changed by simply loosening the bolts 55, moving the plate 52 and allowing the bolts 55 to take up a new position in the slots 54. By this mechanism the fully opened position of the gate valve 36 can be readily changed.

The left hand end plate 42 of the gate valve 36 is provided with a lug 57 which comes into contact with an end-stop 58, the supports for which will be described below, and arrests the rotational movement of the gate in the fully closed position. A pivotally mounted L-shaped stop or spacer plate 60, however, is located adjacent to the stop 58 and may be rotated into position between the lug 57 and the stop 58 where it serves to arrest the pivotal movement of the gate valve 36 in the partially closed "dribble" position.

Figure 4:
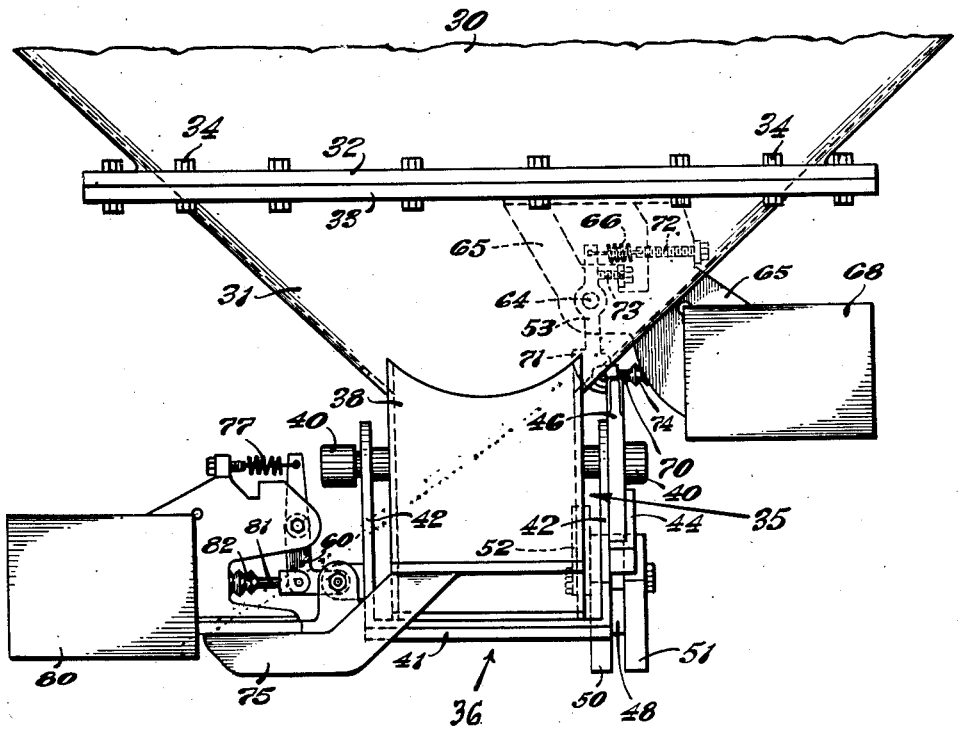
Fig. 4 is a view in front elevation showing the packing gate in the partially closed dribble position.

The control mechanism for the hook 53 and the spacer plate 60 will now be described. The hook 53 is pivotally mounted at its midsection upon a bearing 64 which is supported by a frame 65 connected to the flange 33 of the hopper bottom piece 31. A tension spring 66 connected between the said frame 65 and the upper end of the hook 53 continuously urges the upper end of the hook 53 to the right as is shown in Fig. 4, where it comes up against an adjusting nut 73 mounted in the frame 65. The spring 66 may be held and adjusted by a similar adjusting nut 72 mounted in the frame 65. Thus the lower end of the hook 53 is constantly urged to the left, in which position it lies in the path of the latch 49. A solenoid indicated generally at 68 supported by the frame 65 and operatively connected to the hook 53 by means of a link 70 serves to withdraw the hook 53 when it is desired to release the latch 49 and allow the gate valve 36 to close by virtue of the force of gravity of the weights 50 and 51. The hook 53 is provided with a slanting lower surface 71, which by virtue of the wedging action of the latch 49 as it rises and strikes the hook 53, causes the lower end of the hook 53 to be moved to the right until the latch 49 passes it; whereupon the spring 66 returns the hook 53 to its former position against the adjusting screw 73, and with its hook portion disposed in the downward path of the latch 49.

The solenoid 68 is housed in a sealed container and the link 70 is provided with a bellows type seal 81 for the prevention of admission of any foreign matter into the working parts of the said solenoid.

The spacer plate 60 is mounted on a frame 75 secured to the forward wall 37 of the duct 35 as shown in Fig. 4. The said spacer plate is mounted pivotally at its midsection on a bearing 76 and its lower end is constantly urged to the right by a tension spring 77 which is secured between the upper end of the spacer plate 60 and the frame 75 urging the said upper end to the left. A solenoid indicated generally at 80 and connected to the frame 75 is operatively associated with the spacer plate 60 by means of a link 81 which connects to the lower end of the said spacer plate 60 and serves to pivot the same from position between the lug 57 and the stop 58, where it is constantly urged by the spring 77. The working parts of the solenoid 80 are protected from foreign matter in the same manner as the solenoid 68 by means of a bellows type seal 82 covering point of entrance of the link 81 into the solenoid 80 container.

Figure 5:
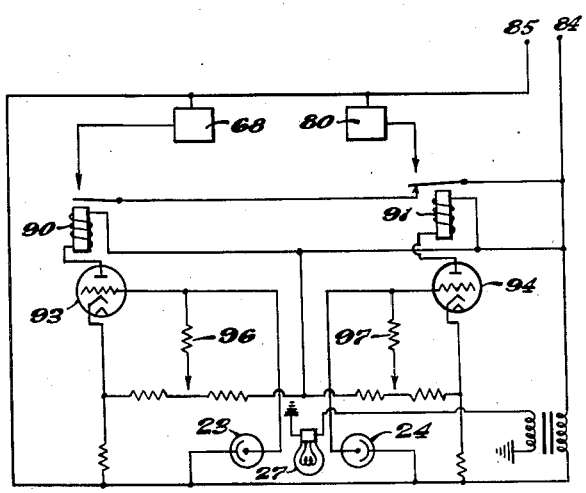
Fig. 5 is a circuit diagram of the control mechanism.

The solenoids 68 and 80 are controlled electrically by conventional photo-electric cells which may preferably employ as a source of power a 110 volt alternating current supply having terminals 84 and 85. Referring now to the circuit diagram shown in Fig. 5, and initially to the solenoid 68, its control mechanism includes a photo-electric cell 23, an electric light bulb 27, a multi-element vacuum tube 93, a voltage divider 96, a single contact relay 90, and a double contact relay 91. The cell 23, the bulb 27, the relay 90 and the voltage divider 96 are of conventional construction, as is the vacuum tube 93 which may preferably be of the multi-element type, including an indirectly heated cathode, a control grid, and a plate. The control grid of the tube 93 is connected through the voltage divider 96 to the terminal 84. Thus only during the positive phase of the terminal 84 will the tube 93 pass current. The tube 93 then acts as a half wave rectifier energizing the relay 90 and causing the contact controlled by it to be held in the open position. The frequency of the alternating current is rapid enough to maintain the said relay 90 in the open position where it remains until the potential of the grid of the tube 93 is changed as will be explained presently to block off the passage of electricity through the said tube. When the shutter 28 is raised by virtue of weight being placed in a container 86, light is admitted to the cell 23 and it commences to conduct electricity. As was explained above, the tube 93 passes current only during the positive phase of the terminal 84 and in order to do this, its grid must likewise be positive; however, the cell 23 is connected in series with the tube and the terminal 85 so that when the cell 23 is conducting electricity it effectually grounds the grid of the tube 93 and prevents the said tube 93 from conducting electricity. When such is the case, the relay 90 is de-energized and moves by force of its spring (not shown) to close the circuit to the solenoid 68. The control circuits for the solenoid 80 are similar to those for the solenoid 68 and include a photo-electric cell 24, the electric light bulb 27, a multi-element vacuum tube 94, a voltage divider 97, and the double contact relay 91. The relay 91 is energized during the positive phase of the terminal 84 as was the relay 90 and holds the relay against its lower contact point. The said lower contact of the relay 91, however, is connected in series to the relay 90. Thus when light is admitted initially to the cell 23 and the relay 90 is de-energized, contact is made at the relay 90 and the circuit energizing the solenoid 68 is closed. This latter circuit comprises the terminal 84, the relay 91 (in its lower position), the relay 90, the solenoid 68, and the terminal 85. Thereafter when the shutters rise further and light is admitted to the cell 24 causing the tube 94 to cease passing current (in the same way as tube 93), the relay 91 is de-energized and moves by force of its spring (not shown) into its upper contact position. Whereupon the circuit energizing the solenoid 68 is broken and the circuit comprising the terminal 84, the relay 91 (in its upper position), the solenoid 80 and the terminal 85 is closed.

It will now be evident that the operation of my invention includes placing the scale unit so that the scale platform 16 is directly under the gate valve 36, and placing upon the scale platform 16, a container 86 in position with its opening directly under the gate valve 36. Thereafter the operator, standing in front of the gate valve 36, depresses the hand lever 46, rotating the gate valve into the open position with the hook 53 engaging the latch 49. The operator then releases the hand lever 46 and the gate valve 36 is held in the fully open position by the hook 53. As the material being loaded enters the container 86 and depresses the scale platform 16, the shutters 28 and 29 commence to rise and since the shutter 28 is shorter than the shutter 29, light is first admitted to the cell 23, whereupon the circuit 84, 91, 90, 68 and 85 is closed, the hook 53 is retracted by the solenoid 68, and the gate valve 36 is allowed to close to the dribble position by virtue of the force of gravity of the counterweights 50 and 51. It will be noted that at this time the solenoid 80 is not energized and therefore the spring 77 operates to rock the spacer plate 60 into position between the end stop 58 and the lug 57 of the left hand end plate of the gate valve 36. Material will continue to fall through the gate valve into the container 86 at a much reduced rate as is graphically represented in Fig. 1. When the desired weight of material is reached, the shutter 29 admits light to the cell 24, the circuit 84, 91, 80 and 85 is closed, the solenoid 80 is energized retracting the spacer plate 60 and allowing the gate valve 36 to come to the fully closed position.

It will be evident that the relative lengths of the shutters 28 and 29 may be readily varied to meet loading specifications and that the initial rate of flow of material in the fully opened position of the gate valve 36 can likewise be regulated by adjustment of the plate 52. Furthermore if it is desired to reduce the size of the opening in the dribble position, the duct 35 can be provided with side walls converging toward the dribble position.

While these and other minor variations will be apparent to those skilled in the art, it is not desired to limit the invention to the precise form of the preferred embodiment herein shown, but rather to measure it in terms of the appended claim.

Having thus described an illustrative embodiment of my invention, what I claim as new and desire to secure by Letters Patent of the United States is:

Weighing apparatus for loading of free flowing material by weight into a container comprising an indicating mechanism and a platform upon which the container rests, walls forming a duct leading to the container and through which the material flows by gravity, axially aligned bearings secured to the said walls, a curved plate in the shape of a segment of a cylinder, side plates connected to the curved plate and pivotally mounting the curved plate upon the said bearings for rotation about its cylindrical axis into and out of sealing relation with the said duct, the lower peripheries of the said walls lying adjacent to the path of the said curved plate, weights laterally offset from and connected to the curved plate urging it by force of gravity into the closed position, hand mechanism for rotating the curved plate into the opened position, movable means for holding said curved plate in its fully opened position, second movable means for holding said curved plate in its partially opened position, said first holding means including a latch mechanism connected to said curved plate for holding said curved plate in its fully opened position, a fixed stop mounted adjacent to said duct, a lug mounted on one of said side plates and movable therewith, said lug and stop being positioned relative to each other for contact engagement when the said curved plate is in sealing engagement with said duct in the fully closed position of said plate to thereby limit the movement of the curved plate to its fully closed position, said second holding means including a spacer pivotally mounted adjacent said stop and adapted to be moved to and away from said stop, said spacer when moved to said stop acting to prevent contact between said lug and said stop, thus holding said curved plate in a partially opened position for dribble feed, a solenoid mechanism operatively associated with said latch mechanism, a second solenoid mechanism operatively associated with said spacer, a photo-electric cell controlling the operation of each of the said solenoid mechanisms, a source of light for the said photo-electric cells, linkage mechanism interconnecting said platform and said indicating mechanism scale, and shutters mounted on said linkage mechanism and positioned relative to said source of light to admit light to the said cells consecutively as the weight of the material deposited in the container increases and causes said linkage mechanism to move in response to said weight, the cells being adapted to actuate the solenoids consecutively, and the solenoids being adapted to first unlatch said latching mechanism and permit said curved plate to move from fully opened position until said lug contacts said spacer to hold said curved plate to a partially opened dribble position, and second to withdraw said spacer from said stop to permit said curved plate to move to a fully closed position and permit said lug to contact said stop.

HARRY D. McWATERS.

REFERENCES CITED

The following references are of record in the file of this patent:

UNITED STATES PATENTS

| Number | Name | Date |
|---|---|---|
| 570,296 | Richards | Oct. 27, 1896 |
| 801,322 | Beakbane | Oct. 10, 1905 |
| 917,519 | Austin | Apr. 6, 1909 |
| 1,274,521 | Dotterer | Aug. 6, 1918 |
| 1,751,760 | Rees | Mar. 25, 1930 |
| 2,022,659 | Fisher et al. | Dec. 3, 1935 |
| 2,044,017 | Robb | June 16, 1936 |
| 2,058,775 | Cundall | Oct. 27, 1936 |
| 2,071,443 | Weckerly | Feb. 23, 1937 |
| 2,169,465 | Hadley | Aug. 15, 1939 |

FOREIGN PATENTS

| Number | Country | Date |
|---|---|---|
| 618,263 | Great Britain | 1949 |